(12) United States Patent
Kim et al.

(10) Patent No.: US 10,912,022 B2
(45) Date of Patent: Feb. 2, 2021

(54) WLAN STATION CAPABLE OF OPTIMIZING POWER SAVING OPERATION

(71) Applicant: FCI INC., Seongnam-si (KR)

(72) Inventors: Jae Ho Kim, Seongnam-si (KR); Chang Hwan Park, Seongnam-si (KR); Jeong Hwan Lee, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 90 days.

(21) Appl. No.: 16/409,615

(22) Filed: May 10, 2019

(65) Prior Publication Data

US 2019/0349851 A1 Nov. 14, 2019

(30) Foreign Application Priority Data

May 10, 2018 (KR) .................. 10-2018-0053519

(51) Int. Cl.
*H04W 52/02* (2009.01)
*H04W 80/06* (2009.01)
*H04W 84/12* (2009.01)

(52) U.S. Cl.
CPC ... *H04W 52/0206* (2013.01); *H04W 52/0216* (2013.01); *H04W 52/0232* (2013.01); *H04W 80/06* (2013.01); *H04W 84/12* (2013.01)

(58) Field of Classification Search
CPC ......... H04W 52/0206; H04W 52/0216; H04W 80/06; H04W 52/0232; H04W 84/12
See application file for complete search history.

(56) References Cited

U.S. PATENT DOCUMENTS

| | | | |
|---|---|---|---|
| 7,085,595 B2 * | 8/2006 | Kitchin | H04L 12/12 455/574 |
| 9,775,109 B2 | 9/2017 | Reinhardt et al. | |
| 9,913,216 B1 * | 3/2018 | Deshpande | H04W 28/14 |
| 2014/0153469 A1 * | 6/2014 | Park | H04W 52/0216 370/311 |
| 2014/0313957 A1 | 10/2014 | Bao et al. | |
| 2015/0036575 A1 | 2/2015 | Li et al. | |
| 2015/0063232 A1 * | 3/2015 | Choi | H04W 4/70 370/329 |
| 2018/0309538 A1 * | 10/2018 | Verma | H04W 28/22 |

FOREIGN PATENT DOCUMENTS

| | | |
|---|---|---|
| CN | 102076067 A | 5/2011 |
| EP | 2628339 B1 | 7/2016 |
| JP | 2014524691 A | 9/2014 |
| WO | 2013139182 A1 | 9/2013 |

* cited by examiner

*Primary Examiner* — Mohammad S Anwar
(74) *Attorney, Agent, or Firm* — Saile Ackerman LLC; Stephen B. Ackerman (57) ABSTRACT

The present disclosure discloses a power saving optimization method and device for an access point of a wireless local area network. The present embodiment discloses a power saving optimization method and device for optimizing the weak wakeup interval, a value of the weak awake time period, and a predicted value of power consumption between a station and an access point associated, in order to optimize power saving when the station performs operations in a low power mode, so as to maintain a sleep mode over a long period of time to a maximum extent without data loss in the low power mode.

14 Claims, 8 Drawing Sheets

DPM Application
◉ TIM Interval
○ Beacon Timeout
IP address : 192.168.0.26
User Wakeup Time Max (sec) : 5
User Wakeup Time Min (sec) : 1
User Wakeup Time Time Test Interval (sec) : 1
Max TIM Interval (sec) : 100
Try Count : 3
Beacon Timeout User Wakeup Time (sec) : 5

[ Connect ]  [ Finish ]  [ Start ]

[ TIM Interval : 2 (sec) setted ] ⓖ
UWT- SUCCESS-FAIL
===================
1 - 3 - 0
2 - 3 - 0
3 - 0 - 3
4 - 0 - 3
5 - 0 - 3

| Type value B3b2 | Type description | Subtype Value b7b6b5b4 | Subtype description |
|---|---|---|---|
| 01 | Management | 0x1 | Update User Wakeup time |
| 01 | Management | 0x2 | Control Tim's PS-Poll |
| 01 | Management | 0x3 | Resume DPM |
| 01 | Management | 0x4 | Test Result |
| 01 | Management | 0x5 | Update TIM wake up value |
| 01 | Management | 0x6 | Test Start Ready |
| 01 | Management | 0x7 | Test Start Ready OK |
| 01 | Management | 0x8 | Test Finish |
| 01 | Management | 0x9 | Test Finish OK |

FIG. 4C

| Type value B3b2 | Type description | Subtype Value b7b6b5b4 | Subtype description |
|---|---|---|---|
| 10 | Data | 0x1 | Date to check PS buffering time |

FIG. 4D

| Subtype Value b7b6b5b4 | Subtype description | Value description |
|---|---|---|
| 0x1 | Date to check PS buffering time | UCHAR 1 Byte : Test sequence number |

FIG. 4E

| Subtype Value b7b6b5b4 | Subtype description | Value description |
|---|---|---|
| 0x1 | Update User Wakeup time with total try count | Octets: 2  1<br>[UWU][Tcnt]<br>UWU : User Wakeup Time in msec<br>Tcnt : Total test count |
| 0x2 | Control Tim's PS-Poll | UCHAR 1 Byte :<br>1 : Turn on PS-POLL<br>0 : Turn off PS-POLL |
| 0x3 | Resume DPM | UCHAR 1 Byte :<br>1 : Resume DPM<br>0 : Hold DPM |
| 0x4 | Test Result of #1 case, TIM wake time check | Octets: 2  1  1<br>[UWU][S][F]<br>UWU : User Wakeup Time<br>S : Success count<br>F : Fail count |
| 0x5 | Update TIM wake up value | UCHAR 1 Byte :<br>e.g.) 5 → 5sec |
| 0x6 | Test Start Ready | UCHAR 1 Byte :<br>1 : User Wake up<br>2 : Beacon time out |
| 0x7 | Test Start Ready OK | UCHAR 1 Byte,<br>Same as Test Start Ready |
| 0x8 | Test Finish | UCHAR 1 Byte<br>Same as Test Start Ready |
| 0x9 | Test Finish OK | UCHAR 1 Byte<br>Same as Test Start Ready |
| 0xa | Get TIM's Beacon Timeout | |
| 0xb | Set TIM's Beacon Timeout | UCHAR 1 Byte<br>to-be-set Beacon Timeout Value (in msec) |
| 0xc | Current TIM's beacon timeout | UCHAR 1 Byte.<br>set Beacon Timeout Value (in msec) |
| 0xd | Test Result of #2 case, Beacon Timeout check. | Octets: 2  1  2<br>[UWU][BCN TOUT][No BCN CNT]<br>UWU : User Wakeup time<br>BCN TOUT : Beacon Timeout Setting Value<br>No BCN CNT : No Beacon Occurrence Count |
| 0xe | Next TCP port | UCHAR 2 Byte.<br>TCP connected after DPM resume |

*FIG. 4F*

| UWT (sec) | B_T (ms) | (a) ASUS RT-AC66U UWT | | | (a) ASUS RT-AC66U B_T | | | (b) DLINK 880L UWT | | | (b) DLINK 880L B_T | | | (c) LINKSYS WRT1900AC UWT | | | (c) LINKSYS WRT1900AC B_T | | | (d) NETGEAR R7000 UWT | | | (d) NETGEAR R7000 B_T | | |
|---|---|---|---|---|---|---|---|---|---|---|---|---|---|---|---|---|---|---|---|---|---|---|---|---|---|
| | | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) | 1 time (S/F) | 2 time (S/F) | 3 time (S/F) |
| 1 | 2 | 5/0 | 5/0 | 5/0 | 26 | 33 | 37 | 5/0 | 5/0 | 5/0 | 24 | 21 | 24 | 5/0 | 5/0 | 5/0 | 24 | 36 | 21 | 5/0 | 5/0 | 5/0 | 22 | 23 | 17 |
| 2 | 4 | 4/1 | 4/1 | 4/1 | 18 | 30 | 40 | 5/0 | 4/1 | 4/1 | 18 | 16 | 23 | 5/0 | 5/0 | 5/0 | 25 | 31 | 25 | 5/0 | 5/0 | 5/0 | 13 | 10 | 13 |
| 3 | 6 | 5/0 | 5/0 | 5/0 | 19 | 23 | 40 | 5/0 | 5/0 | 5/0 | 14 | 13 | 12 | 3/2 | 0/5 | 2/3 | 22 | 19 | 21 | 5/0 | 5/0 | 5/0 | 4 | 7 | 4 |
| 4 | 8 | 5/0 | 5/0 | 5/0 | 20 | 17 | 27 | 5/0 | 5/0 | 5/0 | 12 | 11 | 10 | 0/5 | 0/5 | 0/5 | 23 | 22 | 17 | 5/0 | 5/0 | 5/0 | 4 | 4 | 4 |
| 5 | 10 | 5/0 | 5/0 | 5/0 | 15 | 6 | 16 | 5/0 | 5/0 | 5/0 | 11 | 6 | 8 | 0/5 | 0/5 | 0/5 | 20 | 12 | 18 | 5/0 | 5/0 | 5/0 | 3 | 2 | 6 |
| 6 | 12 | 5/0 | 5/0 | 5/0 | 3 | 6 | 7 | 5/0 | 5/0 | 5/0 | 7 | 10 | 7 | 0/5 | | 0/5 | 21 | 10 | 16 | 5/0 | 5/0 | 5/0 | 4 | 2 | 2 |
| 7 | 14 | 5/0 | 5/0 | 5/0 | 4 | 5 | 7 | 5/0 | 5/0 | 5/0 | 8 | 8 | 5 | | | | 17 | 8 | 16 | 5/0 | 5/0 | 5/0 | 3 | 4 | 3 |
| 8 | 16 | 5/0 | 5/0 | 5/0 | 3 | 6 | 4 | 5/0 | 4/1 | 5/0 | 7 | 5 | 5 | | | | 19 | 6 | 15 | 5/0 | 5/0 | 5/0 | 3 | 3 | 4 |
| 9 | | 5/0 | 5/0 | 5/0 | | | | 5/0 | 5/0 | 5/0 | | | | | | | | | | 5/0 | 5/0 | 5/0 | | | |
| 10 | | 5/0 | 5/0 | 5/0 | | | | 5/0 | 5/0 | 5/0 | | | | | | | | | | 5/0 | 5/0 | 5/0 | | | |

FIG. 5

DPM Application
● TIM Interval ①
○ Beacon Timeout
IP address : 192.168.0.26 ②
User Wakeup Time Max (sec) : 5           ③
User Wakeup Time Min (sec) : 1
User Wakeup Time Time Test Interval (sec) : 1
Max TIM Interval (sec) : 100
Try Count : 3
Beacon Timeout User Wakeup Time (sec) : 5
④ Connect   Finish   Start

FIG. 6A

DPM Application
● TIM Interval
○ Beacon Timeout
IP address : 192.168.0.26
User Wakeup Time Max (sec) : 5
User Wakeup Time Min (sec) : 1
User Wakeup Time Time Test Interval (sec) : 1
Max TIM Interval (sec) : 100
Try Count : 3
Beacon Timeout User Wakeup Time (sec) : 5
Connect   Finish   Start ⑤

FIG. 6B

DPM Application
◉ TIM Interval
○ Beacon Timeout
IP address : 192.168.0.26
User Wakeup Time Max (sec) : 5
User Wakeup Time Min (sec) : 1
User Wakeup Time Time Test Interval (sec) : 1
Max TIM Interval (sec) : 100
Try Count : 3
Beacon Timeout User Wakeup Time (sec) : 5

| Connect | Finish | Start |

TIM Interval : 2 (sec) setted    ⑥
UWT- SUCCESS-FAIL
===================
1 - 3 -0
2 - 3 -0
3 - 0 -3
4 - 0 -3
5 - 0 -3

FIG. 6C

WLAN STATION CAPABLE OF OPTIMIZING POWER SAVING OPERATION

CROSS-REFERENCE TO RELATED APPLICATION

This application claims priority to and the benefit of Korean Patent Application No. 10-2018-0053519, filed on May 10, 2018, the disclosure of which is incorporated herein by reference in its entirety.

FIELD OF INVENTION

The present embodiment relates to optimizing power saving operation of a WLAN station in relation to an access point (AP) of a wireless local area network.

BACKGROUND OF INVENTION

The content described below only provides background information related to the present embodiment, and is not constituted to the prior art.

According to a power management model in the IEEE 802.11 wireless local area network (WLAN) standard, a station enters into a power saving mode to reduce power consumption when no more data is sent or received.

In the power saving mode, the station is switched from a sleep state to an awake state every wakeup interval, and then checks traffic indication message (TIM) or delivery TIM (DTIM) in a beacon frame that is transmitted periodically from an access point (AP).

If it is determined that there is data to be received as a result of the check, the station transmits a power saving polling (PS-Poll) message to the AP to receive the data from the AP. In addition, if the checking result is that there is no data to be received, the station is re-switched to the sleep state.

As described above, the power management model in the 802.11 WLAN the station attempts to enter into the sleep state to minimize power consumption for low power operating. Typically, single main application implements various stages of the power management model of the 802.11 WLAN which includes switching from the sleep state (i.e., a doze state) into the awake state.

Therefore, the main application needs to be equipped with all functions that are related to communication services in accordance with the power management model of the 802.11 WLAN. Specifically, the main application includes communication services not essential codes and data required for communication services (e.g., checking TIM/DTIM), but also other codes and data related to additional services.

In such an implementation, an initialization procedure for the additional services needs to be executed, which involves many problems such as unnecessary extra initialization time increases, and hardware modules related to the additional services should be powered, thereby causing unnecessary power consumption.

SUMMARY OF INVENTION

The present embodiment discloses a WLAN station capable of detecting a maximum buffering time of an access point to optimize a wake-up interval, and determining an awake time period (i.e., a beacon timeout), a predicted value of power consumption, etc., in order to optimize a power saving operation when the station performs in a low power mode, such that the station remains in the sleep state for as long as possible without data loss in the low power mode.

According to one aspect of the present embodiment, a WLAN station capable of optimizing power saving operation is provided which comprises a test unit configured to perform a first test for each of wake-up intervals, wherein the first test includes i) entering into a low power mode, ii) performing a full wake-up to attempt to receive buffered data from an access point (AP) when the wake-up interval has elapsed after entering the low power mode, and iii) checking whether the buffered data has been successfully received from the AP. The WLAN station further comprises an optimization setting unit configured to set a TIM interval based on the longest wakeup interval among the wake-up intervals that the buffered data was successfully received, wherein the WLAN station, in the low power mode, periodically performs a weak wake-up at the TIM interval to receive the beacon signal from the AP. In some embodiments, the test unit is further configured to perform a second test for each of beacon timeouts, wherein the second test includes i) entering into the low power mode, ii) periodically performing the weak wake-up from a sleep state so as to wait for the beacon signal transmitted from the AP, and returning to the sleep state when the beacon timeout elapses. The test unit is further configured to check the number of beacon losses that have occurred for each of beacon timeouts, and wherein the optimization setting unit further configured to set an optimal beacon timeout based on the number of beacon losses that have occurred for each of beacon timeouts.

According to another aspect of the present embodiment, a method for optimizing power saving operation performed by a WLAN station is provided which comprises performing a first test for each of wake-up intervals, wherein the first test includes i) entering into a low power mode, ii) performing a full wake-up to attempt to receive buffered data from an access point (AP) when the wake-up interval has elapsed after entering the low power mode, and iii) checking whether the buffered data has been successfully received from the AP. The method further comprises setting a TIM interval based on the longest wakeup interval among the wake-up intervals that the buffered data was successfully received, wherein the WLAN station, in the low power mode, periodically performs a weak wake-up at the TIM interval to receive the beacon signal from the AP.

As described above, according to the present embodiment, the station and method can optimize the TIM interval and a value of beacon timeout in relation to the AP, and can calculate a predicted value of power consumption between the station and the AP, so as to optimize the power saving operation when the station operates in a low power mode, and to maintain the sleep state over a long period of time to a maximum extent without data loss in the low power mode.

According to the present embodiment, the optimum values of the different power saving characteristics of the various APs are found and applied to communications between the AP and the STA to provide an optimum power saving effect.

According to the present embodiment, a problem can be solved in which data losses occur in communications between an AP having a relatively short buffering time and an STA performing in a sleep mode for a long time. Data loss can be reduced along with power saving in communications between an AP having a relatively long buffering time and an STA performing in the sleep mode for a relatively short time.

DETAILED DESCRIPTION OF PREFERRED EMBODIMENTS

Hereinafter, the present embodiment will be described in detail with reference to drawings.

Figure 1:
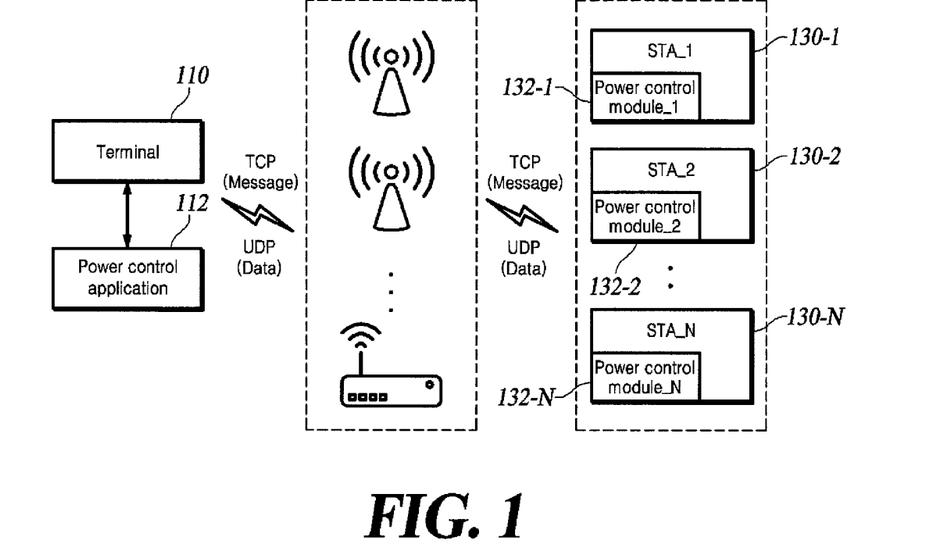
FIG. 1 is a block diagram of a power saving optimization system in accordance with the present embodiment.

FIG. 1 is a block diagram for schematically showing a power saving optimization system in accordance with the present embodiment.

A WLAN device (commonly referred to as "station", hereinafter "STA") inter-working with a wireless network of WLAN employs a "low power mode" for the purpose of reducing power consumption. The low power mode may be also referred to a power saving mode.

A power saving optimization system in accordance with the present embodiment includes a terminal 110, a power control application 112, an AP 120, and an STA 130. Elements of the power saving optimization system may not be necessarily limited to the description mentioned here.

The terminal 110 refers to an electronic device that executes audio communications or data communications via a network according to key operations by a user. The terminal 110 includes a storage for storing a program or protocol for communicating with the STA 130 via the AP 120, a microprocessor for calculating and controlling operations for execution of corresponding software programs, and the like.

The terminal 110 may be an electronic device, such as a smartphone, a tablet, a laptop, a personal computer (PC), a personal digital assistant (PDA), a portable multimedia player (PMP), a wireless communication terminal, a medium player, a WLAN device (STA) for wireless network communication, etc.

The terminal 110 in accordance with the present embodiment can be equipped with a power control application 112 to have the STA 130 tests the AP 120, and to optimize communication settings between the AP 120 and the STA 130, based on the test result (result data). The terminal 110 drives the power control application 112 according to the operations or commands from the user.

The power control application 112 refers to a software application that can be downloaded and installed from an App store in case that the terminal 110 is a smartphone. The terminal 110 equipped with an operating system (OS) can also be equipped with the power control application 112 in the form of, e.g., embedded software. Alternatively, the OS installed in the terminal 110 can equip itself with the power control application 112 pursuant to operations or commands by the user.

The terminal 110 is preferably equipped with the power control application 112 to perform various operations using the hardware resources of the terminal 110, but not limited thereto, and the application 112 may be implemented as an independent device. In addition, the power control application 112 can be linked to other applications that are included in the terminal 110.

AP 120 refers to a device that links wireless devices to wired devices in the network based on the WIFI standard. The AP 120 is typically connected to a router via a wired network to relay data between wireless devices such as STA 130, terminal 110, and wired devices within the network.

The AP 120 is capable of recognizing that the STA 130 operates in a low power mode, and the AP 120 buffers data to be transmitted to the STA 130 for a prescribed buffering time when the STA 130 operates in the low power mode.

In other words, when the AP 120 wishes to transmit data to the STA 130 while the STA 130 is operating in the low power mode, the AP 120 temporarily stores the data in the memory therein. When the STA 130 wakes up, the AP 120 attempts to send the buffered data to the STA 130.

Since the AP 120 is manufactured by various manufacturers, the hardware specifications and characteristics are different from one another. Under these circumstances, while the STA 130 is in the low power mode, the buffering time for data is different from one another.

The STA 130 is an electronic device that exchanges data to/from the AP 120. The STA 130 is provided with a storage for storing a program or a protocol for communications with the AP 120, a microprocessor for performing operations and controls for communications, and the like.

The STA 130 may be devices such as digital door locks, doorbells, and low-power battery-operated devices.

The STA 130 is equipped with (i) a communication device, such as a communication modem for communications with various communication devices or a wired/wireless network, (ii) storages for storing various programs and data, and (iii) various elements, such as a microprocessor for use in executing programs for operations and controls. According to at least one embodiment of the invention, the storage may be a computer readable medium, such as random access memory (RAM), read only memory (ROM), flash memory, optical disk, magnetic disk, solid state disk (SSD), or the like. According to at least one embodiment, the microprocessor may be programmed to select one or more operations and function described in the specification. According to at least one embodiment, the microprocessor may be implemented in whole or in part as a hardware of a custom semiconductor with a specific configuration, e.g., application specific integrated circuit (ASIC).

Data and programs are stored in the storage, and the microprocessor reads data from the storage for performing communication-related processes. Each of the above-mentioned functions can be executed by a single processor, but can also be implemented by a plurality of processors each of which performs part of the processes. The processor can be implemented as a general purpose processor, but can also be implemented as a general-purpose chip for executing the functions described above.

The STA 130 includes the power control module 132. The STA 130 can communicate with the AP 120 by using the equipped power control module 132. The STA 130 can communicate with the terminal 110 via the AP 120.

The STA 130 can perform tests on the AP 120 based on the signal received from the terminal 110 via the AP 120, and can optimize parameter values relative to communications and/or the low power mode based on the test result (result data).

The STA 130 may interwork with the terminal 110 in order to optimize the parameter values related to communications such that can communicate with the AP 120 without data loss in the low power mode. According to an embodiment of the present invention, the STA 130 detects a maximum buffering time of the AP 120 to optimize a weak wake-up interval so that the STA 130 remains in the sleep state for as long as possible without data loss in the low power mode. According to another embodiment of the present invention, the STA 130 optimizes an awake time period (i.e., a beacon timeout) during which the STA 130 waits for the beacon signal. According to still another embodiment of the present invention, the STA 130 calculates an estimate of power consumed for reception.

The power control module 132 in accordance with the present embodiment may be equipped in the STA 130 by software, hardware, or a combination thereof. The power control module 132 may be equipped in the form of a single IC chip into various devices that require low-power operation such as digital door locks, doorbells, and battery-operated devices.

In the present disclosure, a full wake-up refers to full booting that runs an operating system and applications. During the full wake-up and/or after the full wake-up, all or most of blocks in the STA 130 are turned on. A weak wake-up refers to small booting that does not run an operation system (OS) but only run application(s) to essential to WLAN Tx/Rx. During the weak wake-up and/or after the weak wake-up, in the STA 130, only blocks essential to WLAN Tx/Rx are turned on and the remaining peripheral blocks are turned off. Compared to the full wake up, the weak wake-up has short boot time and low power consumption. The state of the STA 130 after performing a weak wakeup may be referred to as a weak awake state, and the state of the STA 130 after performing a full wakeup may be referred to as a full awake state.

The First Embodiment

According to the first embodiment, the power control module 132 calculates and/or detects a maximum buffering time for each of various APs 120 in order to operate the STA 130 in the low power mode without data losses in communications with the AP 120.

The STA 130 can enter into the sleep state in order to reduce power consumption. When the STA 130 operates in the sleep state, the AP 120 cannot transmit data to the STA 130, rather buffers the corresponding data. When a prescribed threshold time (i.e., the maximum buffering time) elapses after buffering of the data, the AP 120 deletes the buffered data. Thus, if the STA 130 remains in the sleep state longer than the buffering time of the AP 120, the STA will fail to receive the buffered data.

Therefore, for the STA 130, it is important to recognize the buffering time of the AP 120 in order both to minimize a data loss rate and to minimize the power consumption. In the meantime, resources and operations of various APs 120 are different from one another, and therefore the buffering times of AP 120 are different from one another. Accordingly, the STA 130 should be able to detect the buffering time supported by the AP 120 to which it is connected.

For purposes of illustration, assume that the maximum buffering time of the AP 120 is "3 seconds" and is unknown to the STA 130 and the power control module 132. As described in detail below, the power control module 132 can detect or determine the maximum buffering time of the AP 120 as being "3 seconds", and when it communicates with the AP 120, operates the STA 130 in a manner that stays in the sleep state from "0 second to 2.8 seconds" and then wakes up at "2.8 seconds" to request data having been buffered by the AP 120.

If the STA 130 were staying in the sleep state for "3 seconds", the buffered data would not be transmitted to the STA 130 and thus would be deleted since the maximum buffering time of the AP 120 is "3 seconds". In other words, the STA 130 fails to receive the buffered data from the AP 120 during the stay in the sleep state, and thus data loss occurs. Therefore, the STA 130 should be able to detect the maximum buffering time of the AP so that the STA 130 remains in the sleep state for as long as possible without data loss in the low power mode. In short, the STA 130 should operate in the low power mode with an optimal wake-up interval.

The power control module 132 includes therein a power control software for performing such optimization. The terminal 110 includes also a power control application 112. Therefore, optimal settings for the low power mode can be searched through communications between the terminal 110 and the power control module 132 via the AP 120.

The power control application 112 running on the terminal 110 communicates with the STA 130 via the AP 120. A transmission control protocol (TCP) agent and a user datagram protocol (UDP) agent run in the power control application 112. The TCP agent is operable for starting and terminating of the sessions with the STA 130, sending control command, and interpreting and processing the received commands. The UDP agent is operable for transmitting data to the STA 130.

The terminal 110 sets up a TCP session (Setup TCP session) with the STA 130. The terminal 110 transmits a command of test start ready (Test Start Ready) to the STA 130 through the TCP session. The terminal 110 receives a test start ready OK message from the STA 130. The terminal 110 transfers new connection information and wake-up interval information to the STA 130. The wake-up interval information may include information about the wake up intervals to be tested (e.g., User Wake-up Time Max/Min/Interval, and Try Count as shown FIG. 6A) in order to search the maximum buffering time of the AP 120. Upon receiving the wake-up interval information, the STA 130 operates in a manner that enters into the low power mode, and performs a full wake-up after the wake-up interval to be tested to attempt to receive the buffered data from the AP 120. The STA 130 checks whether the buffered data has been successfully received from the AP 120, and then transmits the test result to the terminal 110 upon opening a new session.

The STA 130 repeatedly performs the same operation with gradually increasing the wake-up interval to be tested (e.g., from 1 second to 2 seconds, 3 seconds, and so on). The STA 130 checks whether the buffered data has been successfully received more than a prescribed number of times (e.g., five times) during a test period (e.g., one minute).

For illustrative purposes, if it is 5 times trials in 1 second as the wake-up interval and 5 times successes, 5 times trials in 2 seconds and 5 times successes, 5 times trials in 3 seconds and 5 times successes, 5 times trials in 4 seconds and 0 times successes, and 5 times trials in 5 seconds and 0 times success, then the STA 130 may determine 3 seconds, in the longest wake-up interval that has succeeded 5 times in 5 attempts, as the maximum buffering time of the AP 120.

Based on the maximum buffering time, the STA 130 may set the optimal sleep time period for which stays in the sleep state during operating in the low power mode. In other word, the STA 130 may sets a weak wake-up interval at which periodically performs the weak wake-up to check the beacon signal during operating in the low power mode. This allows the STA 130 to remain in the sleep state for as long as possible without data loss. Since the beacon signal is checked at the weak wakeup interval, the weak wakeup interval may be referred to as a TIM interval.

Operation of the STA 130 in the first embodiment is as follows.

The power control application 112 running in the terminal 110 establishes a TCP session with the STA 130 via the AP 120. The power control application 112 sets the wake-up interval information and other information to the STA 130 through the TCP session. The power control application 112 transmits a setup message to the STA 130 through the TCP session, and then the STA 130 enters into the low power mode.

When the STA 130 enters in the low power mode, the power control application 112 transmits data to the STA 130 by using the user datagram protocol (UDP).

The AP 120 buffers the data while the STA 130 is operating in the low power mode. The STA 130 performs a full wake-up to request the buffered data from the AP 120 when the wake-up interval to be tested has elapsed after entering the low power mode. If the AP 120 transmits the buffered data to the STA 130 in response to the request of STA 130, the wake-up interval being tested can be considered to be compatible with the maximum buffering time of the AP 120.

For the test period (e.g., one minute), the STA 130 gradually increases the wake-up interval to be tested in order to find out the maximum buffering time of the AP 120. Once finding out the maximum buffering time of the AP 120, the STA 130 sets the optimal sleep time period to stay in the sleep state during operating in the low power mode, i.e., may sets the weak wake-up interval (or the TIM interval) at which periodically performs the weak wake-up to check the beacon signal.

Second Embodiment

As described above, in the low power mode, the STA 130 performs a weak wake-up periodically which switches from the sleep state to the weak awake state, to receive the beacon signal transmitted from the AP 120. An awake time period is the time period during which the STA 130 stays in the weak awake state. In order for the STA 130 to successfully receive the beacon signal, the beacon signal must arrive at the STA 130 within the awake time period. The STA 130 can determine an optimal awake time period during which the STA 130 will remain in the weak awake state, as described in detail below.

More specifically, in the low power mode, the STA 130 performs the weak wake-up periodically at the weak wake-up interval (e.g., 100 ms). In the weak wake-up, the STA 130 is switched from the sleep state to the weak awake state, maintains the weak awake state during the awake time period to be tested to receive the beacon signal and then switches to the sleep state again. After its full wake-up, the STA 130 counts the number of beacon losses that occurred during a prescribed period (e.g., one minute).

During a test period (about 5 minutes), the STA 130 gradually adjusts the awake time period to be tested (e.g., from 2 ms, to 4 ms, 6 ms, 8 ms, 16 ms, and so on), for example, every minute. The STA 130 checks the number of beacon losses that occurred for each of the awake time periods being tested.

As an example, 26 beacon losses may occur when the awake time period is 2 ms, 20 beacon losses may occur when the awake time period is 4 ms, 19 beacon losses may occur when the awake time period is 6 ms, and 18 beacon losses may occur when the awake time period is 8 ms. The longer the awake time period, the less beacon loss will occur.

The STA 130 selects, as an optimal awake time period, the awake time period in which the beacon loss rate falls below a prescribed threshold among the plurality of awake time periods being tested.

From the timeline view of the operation the STA 130 described below, the awake time period may also be referred to as "a beacon timeout".

The STA 130 enters into the weak awake state in order to thereby receive the beacon signal from the AP 120 in the low power mode. After waiting for the beacon signal until the beacon timeout elapses, the STA 130 returns to the sleep state again. A beacon reception rate varies depending on the length of the beacon timeout. In light of this, the awake time interval, during which the STA 130 remain in the weak awake state, may also be referred to as the beacon timeout to wait for the beacon signal.

Operations of the STA 130 in the second embodiment are as follows.

The power control application 112 is linked to the STA 130 via the AP 120 by using transmission control protocol (TCP). The power control application 112 running on the terminal 110 sets a prescribed period (during which each beacon timeout is tested; e.g., one minute) and an initial beacon timeout to the STA 130 by using the TCP. The power control application 112 transmits a setup message to the STA 130 by using the TCP. The STA 130 enters the low power mode to test the beacon timeouts.

The STA 130 measures the count of beacon losses during the prescribed period (e.g., for one minute) for each of the beacon timeouts. During the test period (e.g., about 5 minutes), the STA 130 may gradually increase the beacon timeout to be tested. After the STA 130 performs the full wake-up (i.e., after entering into the full awake state), the STA 130 transmits the measured count of the beacon losses to the power control application 112 running on the terminal 110. The power control application 112 determines an optimal value of beacon timeout based on the measured count of the beacon losses. The power control application 112 may determine, as the optimal value of the beacon timeout, the beacon timeout in which the number of beacon loss falls below a prescribed threshold among the plurality of beacon timeouts. The power control application 112 may connect itself to the STA 130 to set the determined optimal value as the new beacon timeout.

Third Embodiment

The STA 130 checks a time to receive (Rx) during the full wake-up and time to receive (Rx) during the weak wake-up in order to measure power consumption in the STA 130. The STA 130 recognizes that time for the full wake-up as Rx, and calculates a full wake-up power consumption by multiplying the Rx by a Rx power consumption. Similarly the STA 130 recognizes that time for the weak wake-up as Rx, and calculates the weak wake-up power consumption by multiplying the Rx by the Rx power consumption. The STA 130 calculates total power consumption by adding the full wake-up power consumption to the weak wake-up power consumption. The STA 130 calculates or estimates available operation time based on the total power consumption.

Based on the total power consumption, the STA 130 estimates the operation time information, e.g., one year or 2 years. In case that the power consumption of the STA 130 exceeds a prescribed threshold, the STA 130 determines that power consumption is abnormal and then generates a check requesting signal.

In power saving operation, the STA 130 repeatedly operates between power down of the power control module 132 to enter the sleep state and a weak/full wake-up to enter the awake state. The STA 130 calculates an average power consumption in order to estimate the power consumption in the power saving operation in which uses the optimized parameter values relative to the low power mode.

Operations of the STA 130 in the third embodiment are as follows.

The power control application 112 links itself to the STA 130 via the AP 120 by using TCP. The power control application 112 sets a user wake-up time for the STA 130 by using TCP. The power control application 112 transmits the setup message to the STA 130 using TCP.

After setting the user wake-up time, the STA 130 transmits a measured value of Rx on time to the low-power control application 112. The power control application 112 calculates power consumption using the received value of Rx on time.

Figure 2:
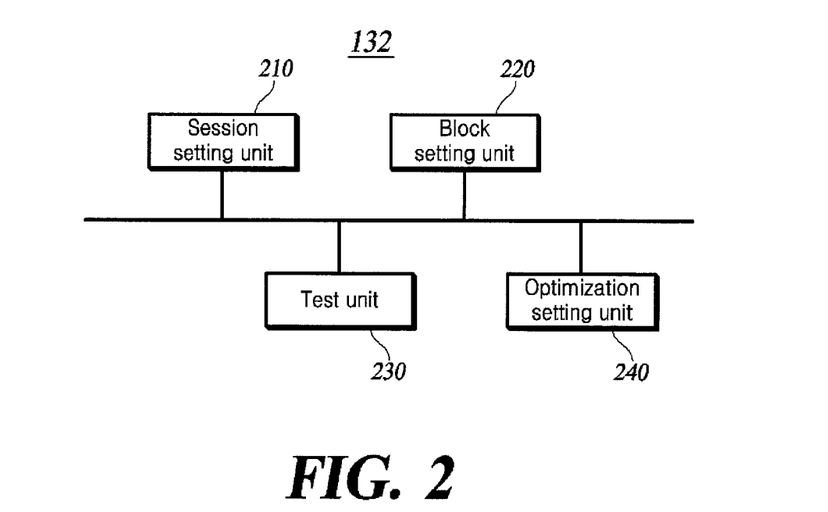
FIG. 2 is a block diagram of a low power control module in accordance with the present embodiment.

FIG. 2 is a block diagram schematically showing a power control module of a STA in accordance with the present embodiment.

The power control module 132 in accordance with the present embodiment includes a session setting unit 210, a block setting unit 220, a test unit 230, and an optimization setting unit 240. The elements included in the power control module 132 are not necessarily limited the description made here.

The components included in the power control module 132 interwork with each other by being linked to a communication paths linking software modules and/or hardware modules therewithin. These elements communicate with each other by using one or more communication buses and/or signal lines.

Each of the elements of the power control module 132 shown in FIG. 2 refers to a unit that processes at least one function or operation, and can be implemented by a software module, a hardware module, or a combination of software and hardware.

It is assumed in the following description that the terminal 110 is connected to the AP 120, and the STA 130 is also connected to the same AP 120 to which the terminal 110 is connected.

The session setting unit 210 sets up the transmission control protocol (TCP) session or cuts off the TCP Session to/from the terminal 110 via the AP 120 connected through the physical layer.

The block setting unit 220 turns off or turns on part of communication functions or settings to the AP 120 in accordance with a control command received from the terminal 110 via the TCP session, as described in detail below.

The block setting unit 220 is configured to bar the wake-up ("Block UC/BC/MC") even though the TIM information included in the received beacon signal indicates that there is buffered data to be transmitted by way of broadcast (BC), multicast (MC), or unicast (UC) frame, in accordance with the control command received from the terminal, with a view to testing the AP 120. The block setting unit 220 is further configured to bar the wake-up ("Block No ACK wakeup") even though the beacon signal is not received from the AP 120 during a prescribed time period, in accordance with the control command received from the terminal 110 via the TCP session with a view to testing the AP 120.

The block setting unit 220 is still further configured not to transmit power saving polling (i.e., a PS-Poll frame) to the AP 120 ("Block PS-Poll send") even though the beacon signal is not received from the AP 120 during a prescribed time period, in accordance with the control command received from the terminal 110 via the TCP session with a view to testing the AP 120.

After the test unit 230 generates the test result data for the AP 120, the block setting unit 220 controls the session setting unit 210 to reset the TCP session with the terminal 110.

After the test unit 230 generates the test result data for the AP 120, the block setting unit 220 is configured to trigger the full wake-up ("Turn on UC/BC/MC") when the TIM information included in the received beacon signal indicates that there is buffered data to be transmitted by way of broadcast (BC), multicast (MC), or unicast (UC) ("Turn on UC/BC/MC"), in accordance with the control command received from the terminal 110 via the TCP session. After the test unit 230 generates the test result data for the AP 120, the block setting unit 220 is further configured to trigger a full wake-up when the beacon signal is not received from the AP 120 ("Turn on No AckWakeup"), in accordance with the control command received from the terminal 110 via the TCP session. After the test unit 230 generates the test result data for the AP 120, the block setting unit 220 is still further configured to transmit a power saving polling when the result data is generated by the test unit 230 ("Turn on PS-Poll send"), in accordance with the control command received from the terminal 110 via the TCP session.

The test unit 230 controls the session setting unit 210 to cut off the TCP session and then switches STA 130 to the low power mode in order to test the AP 120.

To optimize the weak wake-up interval (i.e., the TIM interval), the test unit 230 is configured to perform a full wake-up to attempt to receive buffered data from the AP 120 when the wake-up interval to be tested has elapsed after entering the low power mode, and check whether the buffered data has been successfully received from the AP 120. The buffered data is data which the terminal has been transmitted through user datagram protocol (UDP) session to the AP 120

The test unit 230 perform is the operations for each of wake-up intervals to be tested, for example, by repeatedly performing the operations with gradually increasing the wake-up interval. The test unit 230 generates a result of repeatedly receiving the buffered data as a result data.

After the result data is generated by the test unit 230, the session setting unit 210 re-establishes the TCP session with the terminal 110, and the result data is transmitted to the terminal 110 via the AP 120 through the TCP session.

To optimize the beacon timeout (i.e., the weak awake time period), the test unit 230 periodically performs the weak wake-up during a prescribed period in order to receive the beacon signal from the AP 120. Then, after waiting for the beacon signal until the beacon timeout to be tested expires or elapses, the test unit 230 returns to the sleep state when the beacon timeout elapses. The test unit 230 checks the number of beacon losses that have occurred for the beacon timeout to be tested during the prescribed period.

The test unit 230 performs the operations for each of beacon timeout s to be tested, for example, by repeatedly performing the operations with gradually increasing the beacon timeout. After performing the full wake-up, the test unit 230 generates the result data based on the counts of the beacon losses pursuant to each of the beacon timeouts.

The test unit 230 may measure the counts of beacon losses that have occurred during the prescribed period (e.g., about 5 seconds) by periodically performing the full wake-up at the prescribed period (e.g., about 5 seconds) elapses. The test unit 230 measures the counts of beacon losses by repeatedly performing the operations with gradually increasing the beacon timeout (e.g., from 2 ms to 4 ms, 6 ms, 8 ms, 16 ms and so on).

The test unit 230 can check the time to Rx as of the full wake-up, multiplies this by the Rx power consumption to calculate the total full wake-up power. The test unit 230 checks the time to Rx as of weak wake-up, multiplies by the Rx power consumption to calculate the total weak wake-up power. The test unit 230 adds the full wake-up power to the weak wake-up power to calculate the total power consumption.

The test unit 230 calculates the time information, i.e., an operable time based on the total power consumption and transmits the time information to the terminal 110. In case that the total power consumption exceeds a prescribed threshold, the STA 130 determines that power consumption is abnormal and then generates and transmits a check requesting signal or an alarm signal to the terminal 110.

The optimization setting unit 240 determines the maximum buffering time of the AP 120 based on the number of successful receipt of the buffered data received from the test unit 230. The optimization setting unit 240 sets an optimal weak wake-up interval based on the determined maximum buffering time.

Once the counts of beacon losses are determined by the test unit 230, the optimization setting unit 240 sets, as an optimal beacon timeout, the awake time period in which the beacon loss rate falls below a prescribed threshold among the plurality of awake time periods.

Figure 3:
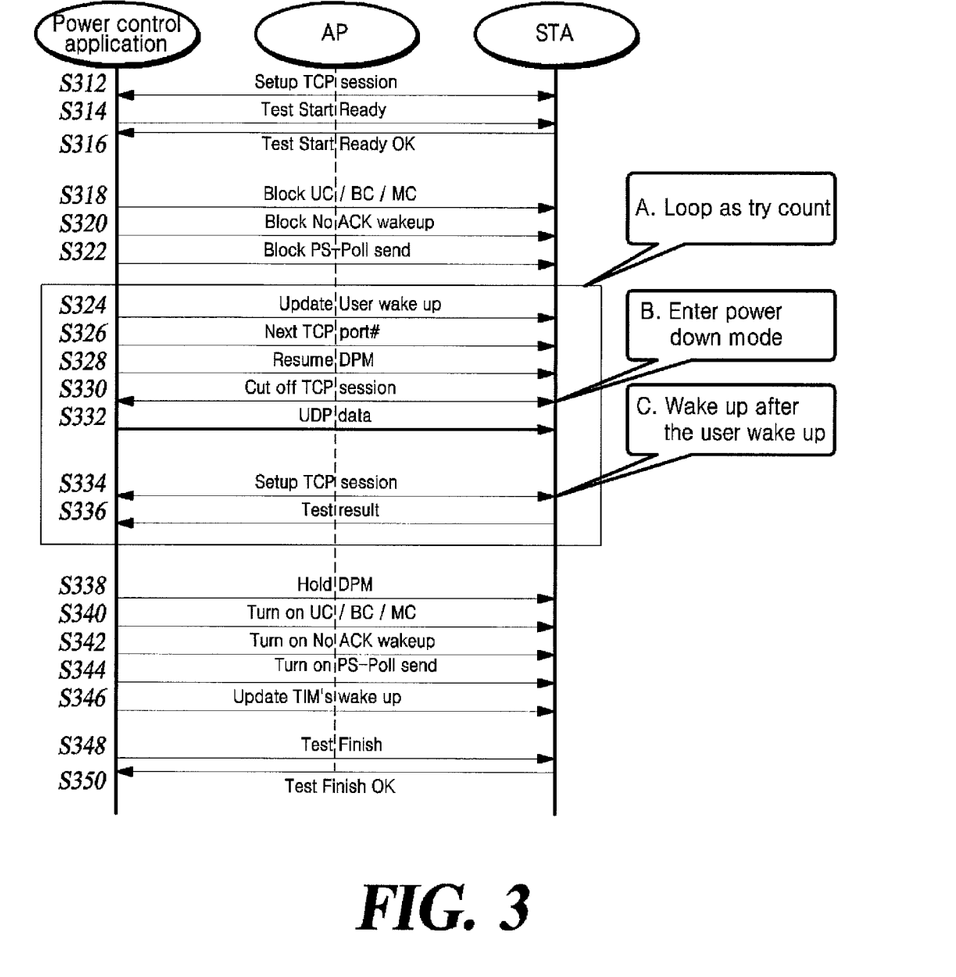
FIG. 3 is a sequence diagram for a power saving optimization method of the present embodiment.

FIG. 3 illustrates a sequence diagram of a power saving optimization method of the present embodiment.

The power control application 112 running on the terminal 110 establishes a TCP session ("Setup TCP Session") between the AP 120 and the STA 130, for the communications with the STA 130 via the AP 120. At Step 312, the terminal 110 is in the state of being connected to the AP 120, and the STA 130 is also in the state of being connected to the same AP 120 which is connected to the terminal 110.

At Step S314, the power control application 112 transmits items to be tested (such as the maximum buffering time (or the TIM interval), the beacon timeout, and estimate of power consumption) to the STA 130 via the AP 120.

At Step 314, the power control application 112 transmits a test start ready request signal to the STA 130 via the AP 120 ("Test Start Ready").

The terminal 110 transmits the test start ready request signal including the interns to be tested (such as maximal buffering time, beacon timeout, and estimate of power consumption) to the AP 120. The AP 120 transmits the test start ready request signal to the STA 130.

When the test is ready, the STA 130 transmits a test start ready OK signal ("Test Start Ready OK") which corresponds to the test start ready request signal to the AP 120. The terminal 110 receives the test start ready OK signal from the AP 120 by using the power control application 112. At Step S316, the STA 130 transmits the test start ready OK signal to the terminal 110 via the AP 120.

At Step S318, the power control application 112 sets the STA 130 via the AP 120 such that the STA 130 does not perform the full wake-up ("Block UC/BC/MC"), even though the STA 130 receives a beacon signal including the TIM information which indicates that there is buffered data to be transmitted by way of broadcast (BC), multicast (MC), or unicast (UC) frame from the AP 120.

Accordingly, after Step S318, the STA 130 does not performs the full wake-up, even though receives the beacon signal including the TIM information which indicates that there is buffered data from the AP 120, in accordance with a setting of the terminal 110.

At Step S320, the power control application 112 sets the STA 130 via the AP 120 such that the STA 130 does not switch into the wake-up state, even though the STA 130 does not receive the beacon signal from the AP 120 in the prescribed time during a testing period ("Block No ACK wakeup").

Accordingly, after Step S320, the STA 130 does not turn into the wake-up state during the test period, even though the STA 130 does not receive the beacon signal in the prescribed time from the AP 120, in accordance with the setting of the terminal 110.

At Step S322, the power control application 112 sets the STA 130 via the AP 120 such that the STA 130 does not transmit a power saving polling ("Block PS-Poll send"). Accordingly, after Step S322, the STA does not transmit the power saving polling to the AP 120, in accordance with the setting of the terminal 110.

At Step S324, the power control application 112 updates the user wake-up time ("Update User wake up"). At Step S324, the power control application 112 sets the period of power down during which the STA 130 operates in the low power mode to the STA 130 via the AP 120 ("Power down").

At Step S326, the power control application 112 sets a port value for next TCP connecting to the STA 130 via the AP 120 ("Next TCP port #"). At Step S328, the power control application 112 sets a trigger for resumes a power down to the STA 130 via the AP 120 ("Resume DPM" or "Resume Dynamic Power Management").

At Step S330, the power control application 112 cuts off the TCP session to the STA 130 via the AP 120 ("Cut off TCP session"). At Step S330, once the TCP session to the STA 130 is cut off, then the STA enters into the low power mode.

At Step S332, the power control application 112 transmits data to the STA 130 via the AP 120 using UDP ("UDP data"). At step S332, since the STA 130 is operating in the low power mode, and the AP 120 buffers the data. After remaining in the sleep state during the user wake-up time that is set at Step S324, the STA 130 performs the full wake-up to receive the buffer data from the AP 120.

At Step S334, the session setting unit 210 of the STA 130 sets the TCP session to the terminal 110 via the AP 120 in order to communicate with the terminal 110 ("Setup TCP session").

At Step S336, the power control application 112 receives a test result (a result data) from the STA 130 ("Test result").

Steps S324 to S336 are repeatedly performed with gradually increasing the user wake-up time or the beacon timeout, Thus the STA 130 transmits the test result (result data) of the repeated test in accordance with values that are set by the power control application 112.

At Step 338, the power control application 112 sets the STA 130 via the AP 120 so that the STA 130 does not enter the low power mode ("Hold DPM").

The power control application 112 sets the STA 130 via the AP 120 so that the STA 130 wakes itself up once the STA receives the broadcast (BC), multicast (MC), unicast (UC) from the AP 120 ("Turn on UC/BC/MC"). Accordingly, at Step S340, the power control application 112 set the function that was turned off at Step S318 to turn on.

At Step S342, the power control application 112 sets the STA 130 via the AP 120 so that the STA 120 turns into the wake-up when the STA 130 does not receive the beacon signal from the AP 120 ("Turn in No ACK wakeup"). Accordingly, at Step S342, the power control application 112 set the function that was turned off at Step S320 to turn on.

At Step S344, the power control application 112 sets the STA 130 via the AP 120 so that the STA 120 transmits the power saving polling to the AP 120 ("Turn on PS-Poll send"). Accordingly, at Step S344, the power control application 112 set the function that was turned off at Step S322 to turn on.

At Step S346, the power control application 112 sets one of the weak wake-up interval (i.e., the sleep time period or the TIM interval) or the beacon timeout (i.e., the weak awake time period) of the STA 130 based on the test result (result data) ("Update TIM's wake up").

At Step S348, the power control application 112 transmits a test finish request signal to the STA 130 via the AP 120 ("Test Finish"). At Step S348, the STA receives the test finish request signal and transmits a test finish response signal to the STA 130 via the AP 120 ("Test Finish OK").

As shown in FIG. 3, Steps S312 to S350 are described as executed in time sequence, but that is not limited to the description mentioned here. In other words, the steps described in FIG. 3 are changeable or executed in parallel.

As mentioned above, the power saving optimization method in accordance with the present embodiment described in FIG. 3 may be implemented by a software program and may be recorded into computer readable medium. The recording medium that stores the program for implementing the power saving optimization method in accordance with the present embodiment and is readable by the computer, includes all types of storage devices in which data is readable by the computer.

FIGS. 4A-4F show an exemplary message format in accordance with the present embodiment.

The frame format between the power control application 112 equipped in the terminal 110 and the STA 130, both communicating via the AP 120, is shown in FIGS. 4A-4F.

In the communications between the power control application 112 and the STA 130, the TCP (in a form of Type Length Value (hereinafter referred to as TLV)) is used for setting or transmitting/receiving feedbacks.

In the communications between the power control application 112 and the STA 130, the UDP is used for data message. The minimum frame size used in the communications between the power control application 112 and the STA 130 is 4 bytes and can be expanded.

In the communications between the power control application 112 and the STA 130, the frames can be divided into $2^4$ types of management and data messages. In the communications between the power control application 112 and the STA 130, the frame can be divided into $2^2$ types of data messages.

Figure 4A:
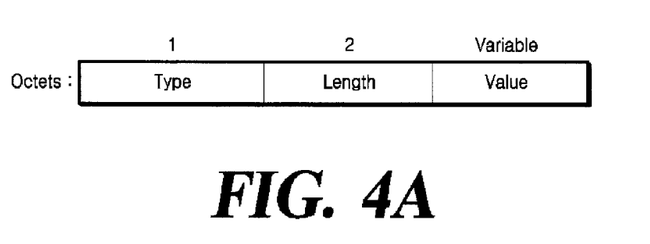
FIGS. 4A-4F show an exemplary message format in accordance with the present embodiment.

The data format for use in the communications between the power control application 112 and the STA 130 is shown in FIG. 4A. The data format types are divided into a type field, a length field and a value field.

Figure 4B:
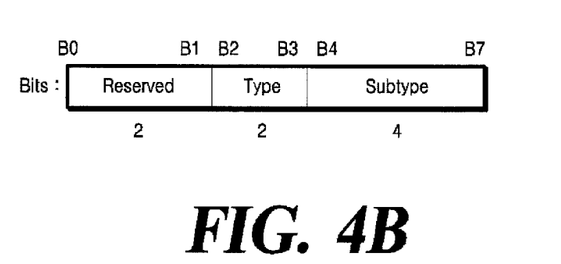

The type field in the data format is shown in FIG. 4B.

The type field in the data format is divided into a reserved field, a type field, and a subtype field, each of which is allocated 2 bits.

Data is not allocated in the reserved field, and the type field is classified into management and data.

In case that the type field is management, the TCP is used when the power control application 112 communicates with the STA 130 via the AP 120. In case that the type field is data, the UDP is used when the power control application 112 communicates with the STA 130 via the AP 120.

A subtype field refers to a sub-item of each type.

Figure 4C:
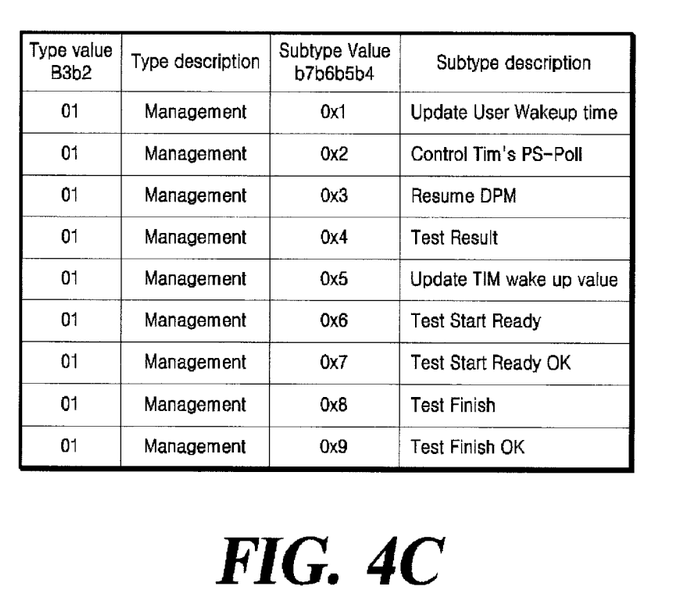
Figure 4D:
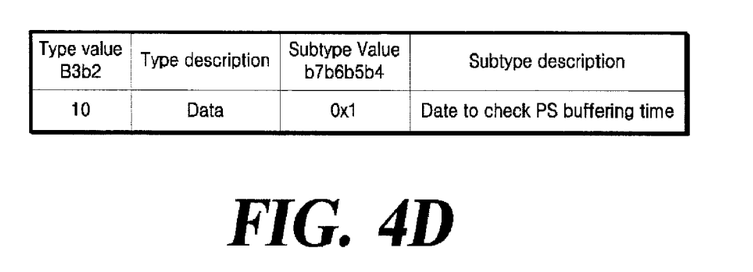

The management message (Management Message) in each sub-item in the subtype (Subtype) field shown in FIG. 4B is shown in FIG. 4C. The data message (Data Message) in each sub-item in the subtype field shown in FIG. 4B is shown in FIG. 4D.

The length field in the data format as shown in FIG. 4A, includes the length of a value other than the type and the length. The value field in the data format, shown in FIG. 4A, is a variable-length field, and its default value is 2 bytes, and can be defined variably according to the requirement of each message.

Figure 4E:
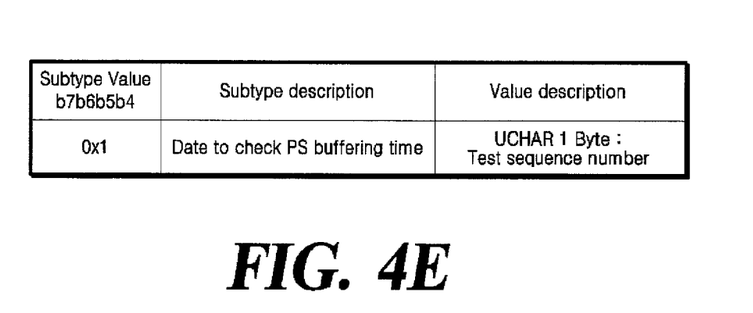
Figure 4F:
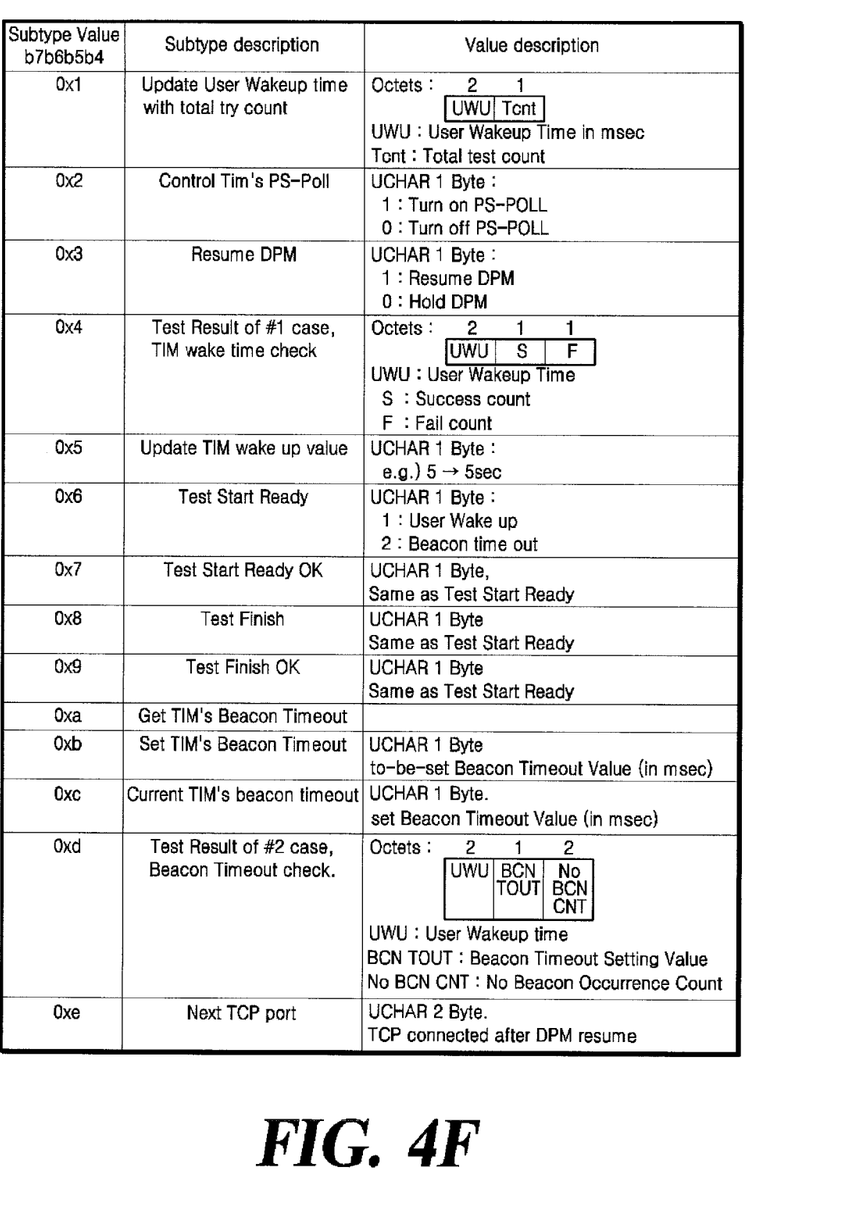

The value format of the management message defined in the value field is shown in FIG. 4F. The value format of the data message defined in the value field is shown in FIG. 4E.

Figure 5:
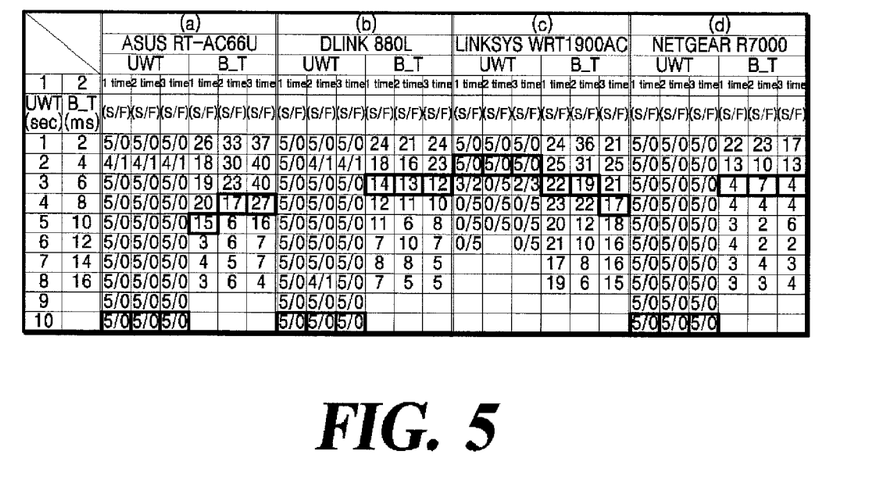
FIG. 5 is a table for listing test result (result data) in accordance with the present embodiment.

FIG. 5 is a table which illustrates the test result (result data) in accordance with the present embodiment.

As shown in (a) in FIG. 5, in case that a model of the AP 120 is ASUS RT-AC66U, the STA 130 turns into the wake-up after performing operations in the sleep state during the prescribed user wake-up time, to increase the prescribed time for repeating the action of receiving the buffered data buffered in the AP due to the sleep mode of the STA 130 from the AP 120, and generates the result of the buffered data that is repeatedly received. As a result, it is determined that the maximum buffering time is "10 seconds" based on the number of the buffered data being successfully received in the result data.

The STA 130 confirms the number of successfully receiving the buffered data as the test result (result data) from the AP 120 within 1 to 10 seconds, and confirms 10 seconds, that is the maximum time from 1 second to 10 seconds, as the maximum buffering time.

With shown in (b) in FIG. 5, in case that a model of the AP120 is DLINK 880L, the STA 130 turns into the wake-up after performing operations in the sleep state during the prescribed user wake-up time, increases the prescribed time for repeating the receipt of the buffered data that have been buffered during the sleep mode from the AP 120, and generates the result data indicating the result of repeatedly receiving the buffered data. As a result, it is determined that the maximum buffering time is "10 seconds" based on the count of the successful receipts of the buffered data.

The STA 130 checks the number of successfully receiving the buffered data from the AP 120 for 1 to 10 seconds, and determines 10 seconds as the maximum buffering time because 10 is the biggest.

As shown in (c) in FIG. 5, in case that a model of the AP120 is LINKSYS WRT1900AC, the STA 130 turns into the wake-up after performing operations in the sleep state during the prescribed user wake-up time, increase the prescribed time for repeating the receipt of the buffered data that have been buffered according to the sleep mode from the AP 120, and generates the result data indicating the result of repeatedly receiving the buffered data. As a result, it is determined that the maximum buffering time is "2 seconds" based on the count of the successful receipt of the buffered data.

The STA 130 checks the number of successfully receiving the buffered data from the test result (result data) from the AP 120 from 1 to 10 seconds, and determines 2 seconds as the maximum time.

With shown in (d) in FIG. 5, in case that a model of the AP 120 is LINKSYS WRT1900AC, the STA 130 turns into the wake-up after performing operations in the sleep state during the prescribed user wake-up time, increase the prescribed time unit for repeating the receipt of the buffered data that have been buffered according to the sleep mode from the AP 120, and generates the result data indicating the result of repeatedly receiving the buffered data. As a result, it is determined that the maximum buffering time is "2 seconds" based on the count of the successful receipt of the buffered data.

The STA 130 checks the number of successfully receiving the buffered data from the AP 120 for 1 to 10 seconds, and deter mines 10 seconds as the maximum buffering time because 10 is the biggest.

Figure 6A:
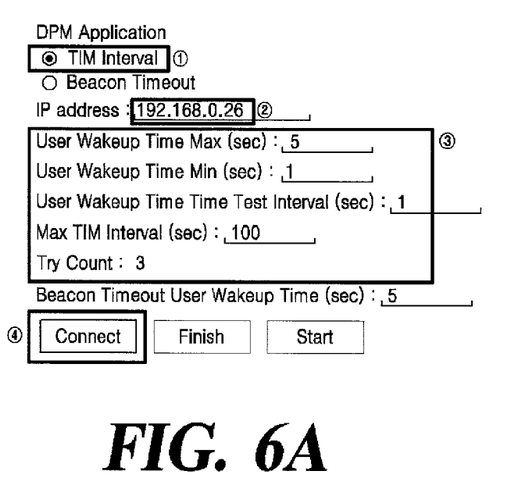
FIGS. 6A, 6B and 6C illustrate operation screens of a power control application in accordance with the present embodiment.
Figure 6B:
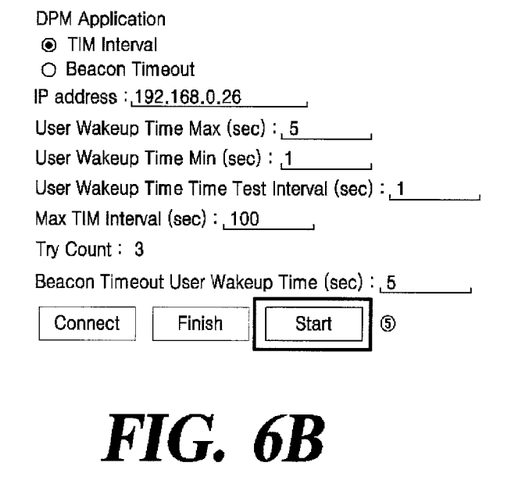
Figure 6C:
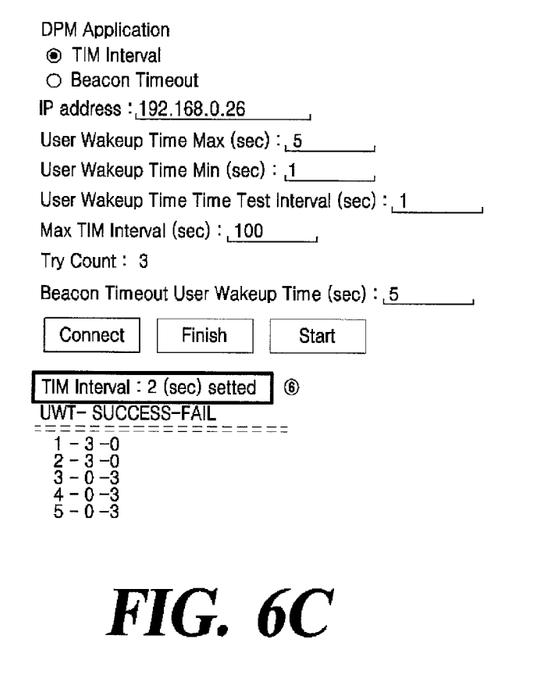

FIGS. 6A, 6B and 6C illustrate operation screens of the power control application of the present embodiment.

As shown in FIG. 6A, the power control application 112 inputs parameters from a user and is connected to the STA 130.

As shown by ① in FIG. 6A, the user may select any one of the TIM interval (i.e., weak wake-up interval) or the beacon timeout as an item to be optimized on the power control application 112.

In the low power mode, the STA 130 checks the field of traffic indication map (TIM) in the beacon frame periodically transmitted from the AP 120 to determine whether there is data to be received is buffered in the AP 120, wherein beacon frame is transmitted in a prescribed period (e.g., 100 ms).

The TIM is a field that indicates the types of data transmission and includes information representing broadcast (BC), multicast (MC), unicast (UC), and the like.

As shown by ② in FIG. 6A, the power control application 112 receives Internet protocol (IP) address from STA 130 and presents the IP address of STA 130 on the operation screen of the power control application.

As shown by ③ in FIG. 6A, the user can set the details of the test items. The user sets such parameters as a user wake-up time max ("User Wakeup Time Max"), a user wake-up time min ("User Wakeup Time Min"), a user wake-up time test interval ("User Wakeup Time Test Interval"), a max TIM interval ("Max TIM Interval"), and a try count ("Try Count").

As shown by ④ in FIG. 6A, the user presses a connect ("Connect") button so as to connect to the STA 130 on the power control application 112.

With shown in FIG. 6B, the power control application 112 requests a start for testing the AP 120 connected to the STA 130.

As shown by ⑤ in FIG. 6B, when the terminal 110 is connected to the STA 130 using power control application 112, the user presses a start ("Start") button that is present on the power control application 112 to start the test of the AP 120.

With shown in FIG. 6C, after the test is over, the power control application 112 receives the test result (result data) from the STA 130 and sets the TIM interval based on the test result.

As shown by ⑥ in FIG. 6C, the power control application 112 receives the test result (result data) from the STA 130 and outputs the test result (result data).

The above description is merely illustrative of the technical idea of the present embodiment, and various modifications and changes can be made without departing from the spirit and scope of the embodiments of the present disclosure. Therefore, the present embodiment is used for explaining the technical idea of the embodiment, and is not intended to limit the technical idea of the embodiment. The scope of the technical idea of the embodiment is not limited to these embodiments. A protection scope in accordance with the present embodiment should be construed as the appended claims, that is, the rights in accordance with the present embodiment include all technical ideas within the scope equivalent to the above protection scope.

DESCRIPTION OF SYMBOLS 110 terminal
112 power control application
120 AP
130, 130-1, 130-2, and 130-N STA
132, 132-1, 132-2, 132-N power control module
210 session setting unit
220 block setting unit
230 test unit
240 optimization setting unit

What is claimed is:

1. A WLAN station capable of optimizing power saving operation, the WLAN station comprising:
a test unit configured to perform a first test for each of wake-up intervals, wherein the first test includes i) entering into a low power mode, ii) performing a full wake-up to attempt to receive buffered data from an access point (AP) when the wake-up interval has elapsed after entering the low power mode, and iii) checking whether the buffered data has been successfully received from the AP; and
an optimization setting unit configured to set a TIM interval based on the longest wakeup interval among the wake-up intervals that the buffered data was successfully received, wherein the WLAN station, in the low power mode, periodically performs a weak wake-up at the TIM interval to receive a beacon signal from the AP.

2. The WLAN station of claim 1, wherein the optimization setting unit is further configured to determine the longest wakeup interval as a buffering time supported by the AP.

3. The WLAN station of claim 1, wherein the test unit is further configured to:
perform a second test for each of beacon timeouts, wherein the second test includes i) entering into the low power mode, ii) periodically performing the weak wake-up from a sleep state so as to wait for the beacon signal transmitted from the AP, and returning to the sleep state when the beacon timeout elapses; and
check the number of beacon losses that have occurred for each of beacon timeouts, and
wherein the optimization setting unit further configured to set an optimal beacon timeout based on the number of beacon losses that have occurred for each of beacon timeouts.

4. The WLAN station of claim 3, the optimization setting unit further configured to set, as the optimal beacon timeout, the shortest beacon timeout among the beacon timeouts where the ratio of the beacon loss is less than a threshold value.

5. The WLAN station of claim 3, further comprising a block setting unit configured to i) prohibit the full wake-up for the first and second tests even though receives from the AP the beacon signal containing a TIM information indicating that there is the buffered data to be transmitted to the WLAN station, ii) prohibit the full wake-up for the first and second tests even though no beacon signal is received from the AP within a prescribed time period, and iii) prohibit to transmit a power saving polling to the AP for the first and second tests.

6. The WLAN station of claim 1, wherein the test unit is further configured to:
   check a first Rx time spent to receive in a full awake state entered by performing the full wake-up;
   calculate a full wake-up power consumption based on the first Rx time;
   check a second Rx time spent to receive in the weak awake state entered by performing the weak wake-up;
   calculate a weak wake-up power consumption based on the second Rx time; and
   calculate a total power consumption of the WLAN station by adding the full wake-up power consumption to the weak wake-up power consumption.

7. The WLAN station of claim 6, wherein the test unit is further configured to estimate available operation time of the WLAN station based on the total power consumption.

8. A method for optimizing power saving operation performed by a WLAN station, the method comprising:
   performing a first test for each of wake-up intervals, wherein the first test includes i) entering into a low power mode, ii) performing a full wake-up to attempt to receive buffered data from an access point (AP) when the wake-up interval has elapsed after entering the low power mode, and checking whether the buffered data has been successfully received from the AP; and
   setting a TIM interval based on the longest wakeup interval among the wake-up intervals that the buffered data was successfully received, wherein the WLAN station, in the low power mode, periodically performs a weak wake-up at the TIM interval to receive a beacon signal from the AP.

9. The method of claim 8, further comprising determining the longest wakeup interval as a buffering time supported by the AP.

10. The method of claim 8, further comprising:
    performing a second test for each of beacon timeouts, wherein the second test includes i) entering into the low power mode, ii) periodically performing the weak wake-up from a sleep state so as to wait for the beacon signal transmitted from the AP, and returning to the sleep state when the beacon timeout elapses;
    checking the number of beacon losses that have occurred for each of beacon timeouts; and
    setting an optimal beacon timeout based on the number of beacon losses that have occurred for each of beacon timeouts.

11. The method of claim 10, further comprising setting, as the optimal beacon timeout, the shortest beacon timeout among the beacon timeouts where the ratio of the beacon loss is less than a threshold value.

12. The method of claim 8, further comprising:
    prohibiting the full wake-up for the first and second tests even though receives from the AP the beacon signal containing a TIM information indicating that there is the buffered data to be transmitted to the WLAN station;
    prohibiting the full wake-up for the first and second tests even though no beacon signal is received from the AP within a prescribed time period; and
    prohibiting to transmit a power saving polling to the AP for the first and second tests.

13. The method of claim 8, further comprising:
    check a first Rx time spent to receive in a full awake state entered by performing the full wake-up;
    calculate a full wake-up power consumption based on the first Rx time;
    check a second Rx time spent to receive in the weak awake state entered by performing the weak wake-up;
    calculate a weak wake-up power consumption based on the second Rx time; and
    calculate a total power consumption of the WLAN station by adding the full wake-up power consumption to the weak wake-up power consumption.

14. The method of claim 13, further comprising estimating available operation time of the WLAN station based on the total power consumption.

* * * * *